(12) United States Patent
Tang et al.

(10) Patent No.: US 12,105,907 B2
(45) Date of Patent: Oct. 1, 2024

(54) DISPLAY PANEL AND OPERATION METHOD THEREOF

(71) Applicant: Novatek Microelectronics Corp., Hsinchu (TW)

(72) Inventors: Yu-Ying Tang, Taoyuan (TW);
Wei-Ren Chang, Tainan (TW);
Chih-Yang Ke, Tainan (TW);
Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/858,945

(22) Filed: Jul. 6, 2022

(65) Prior Publication Data
US 2023/0152918 A1    May 18, 2023

Related U.S. Application Data

(60) Provisional application No. 63/278,501, filed on Nov. 12, 2021.

(51) Int. Cl.
*G06F 3/041* (2006.01)
*G06F 3/0354* (2013.01)
*G09G 3/20* (2006.01)

(52) U.S. Cl.
CPC ...... *G06F 3/04162* (2019.05); *G06F 3/03545* (2013.01); *G06F 3/0412* (2013.01); *G09G 3/20* (2013.01); *G09G 2300/0408* (2013.01); *G09G 2310/0267* (2013.01); *G09G 2354/00* (2013.01)

(58) Field of Classification Search
CPC ............. G06F 3/04162; G06F 3/03545; G06F 3/0412; G06F 3/20; G09G 2300/0408; G09G 2310/0267; G09G 2354/00
See application file for complete search history.

(56) References Cited

U.S. PATENT DOCUMENTS

| | | | |
|---|---|---|---|
| 8,525,941 B2 | 9/2013 | Shi et al. | |
| 9,201,532 B2 | 12/2015 | Omori et al. | |
| 10,055,036 B2 | 8/2018 | Koike et al. | |
| 10,826,015 B2 | 11/2020 | Yu et al. | |
| 10,942,598 B2 | 3/2021 | Koike et al. | |
| 11,347,346 B2 | 5/2022 | Koike et al. | |
| 11,556,204 B2 | 1/2023 | Koike et al. | |
| 2011/0090158 A1* | 4/2011 | Omori | G06F 3/0412 |
| | | | 345/173 |
| 2011/0127092 A1 | 6/2011 | Lu | |

(Continued)

FOREIGN PATENT DOCUMENTS

| | | |
|---|---|---|
| CN | 101930134 | 12/2010 |
| CN | 107533397 | 1/2018 |

(Continued)

OTHER PUBLICATIONS

"Office Action of Taiwan Counterpart Application", issued on Aug. 21, 2023, p. 1-p.14.

*Primary Examiner* — Stephen G Sherman
(74) *Attorney, Agent, or Firm* — JCIPRNET

(57) ABSTRACT

A display panel and an operation method of the display panel are provided. The display panel includes a display area and a frame area. The display area is configured to display an image. During a touch sensing period, the display area and the frame area emit an uplink signal to perform an active stylus touch detection operation.

27 Claims, 10 Drawing Sheets

(56) References Cited

U.S. PATENT DOCUMENTS

| | | | | |
|---|---|---|---|---|
| 2012/0092577 | A1* | 4/2012 | Shi | G02F 1/13338 |
| | | | | 445/24 |
| 2015/0145818 | A1* | 5/2015 | Jeon | G06F 3/0443 |
| | | | | 345/174 |
| 2016/0225787 | A1* | 8/2016 | Katsuta | H01L 27/1222 |
| 2018/0024654 | A1 | 1/2018 | Koike et al. | |
| 2018/0356908 | A1 | 12/2018 | Koike et al. | |
| 2019/0036073 | A1* | 1/2019 | Yu | G06F 3/0412 |
| 2019/0196639 | A1* | 6/2019 | Mugiraneza | G06F 3/046 |
| 2021/0191592 | A1 | 6/2021 | Koike et al. | |
| 2022/0019327 | A1* | 1/2022 | So | G06F 3/04162 |
| 2022/0291797 | A1 | 9/2022 | Koike et al. | |
| 2023/0127561 | A1 | 4/2023 | Koike et al. | |
| 2024/0069390 | A1* | 2/2024 | Mori | G02F 1/136213 |

FOREIGN PATENT DOCUMENTS

| | | | | |
|---|---|---|---|---|
| CN | 108766994 | | 11/2018 | |
| EP | 3751400 A1 | * | 12/2020 | G06F 3/03 |
| TW | 201118698 | | 6/2011 | |
| TW | 201118849 | | 6/2011 | |
| TW | 201411241 A | * | 3/2014 | G02F 1/13338 |

\* cited by examiner

DISPLAY PANEL AND OPERATION METHOD THEREOF

CROSS-REFERENCE TO RELATED APPLICATION

This application claims the priority benefit of U.S. provisional application Ser. No. 63/278,501, filed on Nov. 12, 2021. The entirety of the above-mentioned patent application is hereby incorporated by reference herein and made a part of this specification.

BACKGROUND

Technical Field

The disclosure relates to an electronic device; more particularly, the disclosure relates to a display panel and an operation method thereof.

Description of Related Art

After a capacitive active stylus is paired with a display device, a user may operate the active stylus to write and draw on a display panel of the display device. In general, the display panel is divided into a display area and a frame area or a border area. The frame area is configured with a light shielding layer, so that the frame area does not have a display function. In addition, the frame area does not have an active stylus detection function nor a touch detection function. The display area is configured to display an image. Besides, the display area has the active stylus detection function and the touch detection function. During a touch sensing period, the display area emits an uplink signal and/or receives a downlink signal emitted by the active stylus, so as to perform an active stylus touch detection operation. For instance, a sensing electrode in the display area of the display panel may emit the uplink signal to the active stylus for pairing communications. After the pairing operation succeeds, the active stylus may emit the downlink signal to the display panel for reporting/positioning.

In order to reduce power consumption of the active stylus, the active stylus generally starts to send a downlink signal to the display panel after the active stylus receives the uplink signal from the display panel. However, such mechanism may lead to issues in some usage scenarios. For instance, when the active stylus draws/moves toward the center from the edge (the frame area) of the display panel, the active stylus in the frame area of the display panel does not receive the uplink signal emitted by the display area of the display panel, and, the active stylus receives the upland signal and starts to perform the pairing operation after entering the display area of the display panel. Therefore, the active stylus is unable to output the downlink signal at the initial stage of entering the display area (a period during which the pairing operation is not yet completed or a period of wakening the active stylus). As a result, the active stylus is unable to write on the edge of the display area when the active stylus draws a line from the frame area to the center. That is, the writing trace of the active stylus is interrupted at the edge of the display area.

The information disclosed in this BACKGROUND section merely serves to enhance understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides a display panel and an operation method thereof to instantly emit an uplink signal to perform an active stylus touch detection operation.

In an embodiment of the disclosure, the display panel includes a display area and a frame area. The display area is configured to display an image. During a touch sensing period, the display area and the frame area emit an uplink signal to perform an active stylus touch detection operation. The frame area is configured to emit the uplink signal during the touch sensing period to perform the active stylus touch detection operation.

In an embodiment of the disclosure, the operation method includes displaying an image by a display area and emitting, by the display area and a frame area, an uplink signal during a touch sensing period to perform an active stylus touch detection operation.

In view of the above, according to one or more embodiments of the disclosure, the frame area of the display panel may emit the uplink signal to the active stylus during the touch sensing period. While the active stylus draws a line/moves toward a center of the display panel from the frame area of the display panel, the active stylus in the frame area is able to receive the uplink signal emitted by the frame area, and then the active stylus in the display area may continue to receive the uplink signal emitted by the display area. Therefore, before the active stylus enters the display area of the display panel, the active stylus may perform the active stylus touch detection operation (e.g., performing a pairing operation) in advance based on the uplink signal emitted by the frame area. The display panel may instantly emit the uplink signal to perform the active stylus touch detection operation. As such, the active stylus is ready to emit a downlink signal to the display panel before entering the display area, and thus when the active stylus draws a line from the frame area toward the center, the active stylus is able to write on the edge of the display area and on other locations.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles provided in the disclosure.

DESCRIPTION OF THE EMBODIMENTS

The terminology "coupled" (or connected) may refer to any direct or indirect connection means. For instance, if it is described in the disclosure that a first device is coupled (or connected) to a second device, it should be interpreted that the first device can be directly connected to the second device, or the first device can be indirectly connected to the second device through other devices or some connection means. The terminologies such as "first", "second", etc. may be used to name elements or distinguish the elements in different embodiments or scope, but the upper or lower limit of the number of the elements should not be limited by these terminologies, nor should the order of the elements be limited. Besides, wherever possible, the same reference numbers marking the elements/components/steps in the accompanying drawings and following embodiments represent the same or similar elements/components/steps, and the descriptions of the elements/components/steps marked by the same reference numbers in one embodiment may be referred by the relevant descriptions of the elements/components/steps in other embodiments.

The following embodiments are provided to explain an improved panel architecture. According to these embodiments, a signal path is placed in a frame area of a display panel to provide an uplink signal to an active stylus. Therefore, the active stylus is able to obtain the uplink signal in the frame area of the display panel (rather than a display area) in advance and complete a pairing operation. According to these embodiments, signal quality of the uplink signal in the frame area may be improved without changing the size of electrodes in the display area, thereby resolving the issue of interrupted writing on the edge of the display panel.

Figure 1:
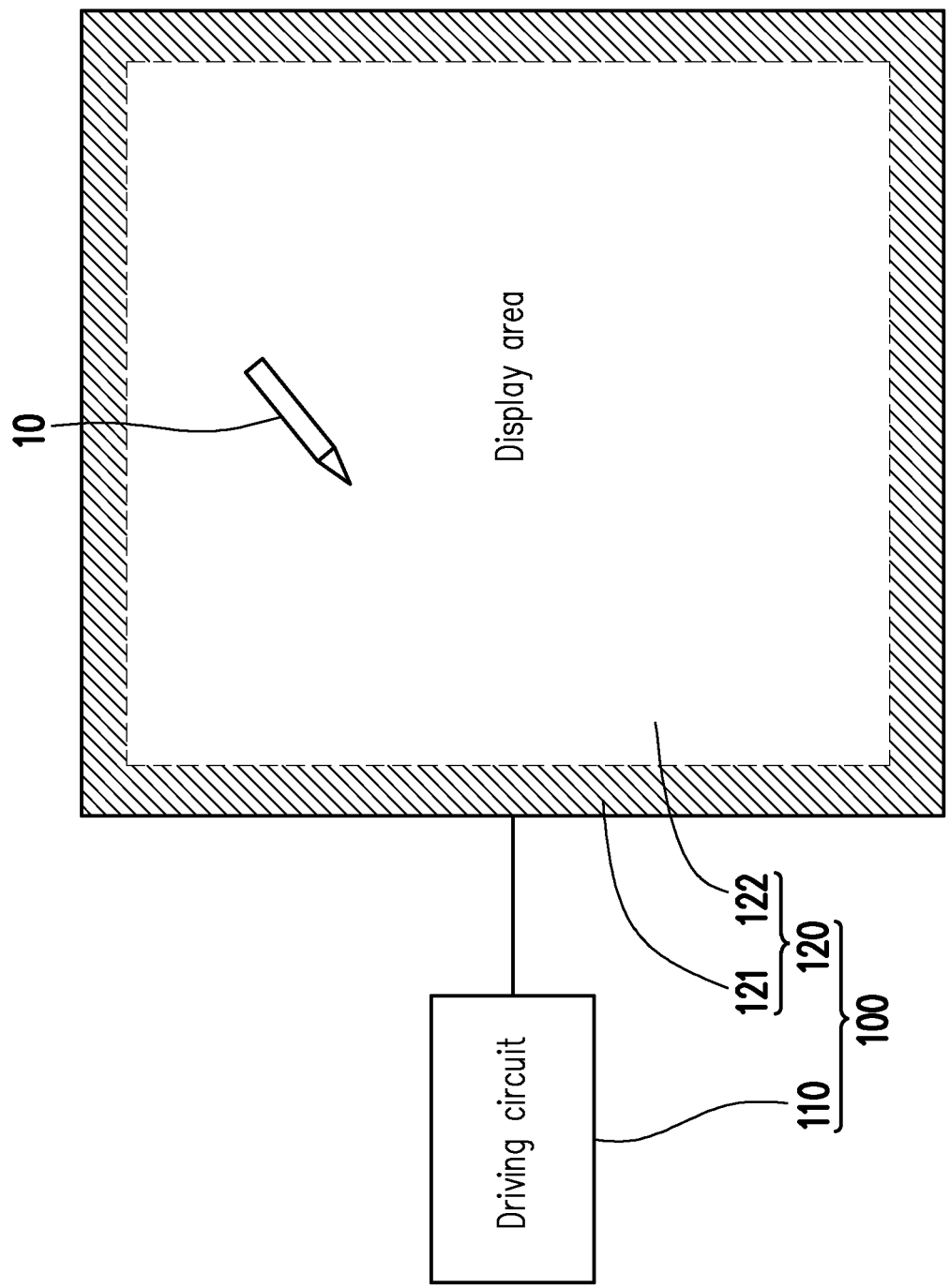
FIG. 1 is a schematic circuit block view of a display device according to an embodiment of the disclosure.

FIG. 1 is a schematic circuit block view of a display device 100 according to an embodiment of the disclosure. The display device 100 shown in FIG. 1 includes a driving circuit 110 and a display panel 120. The driving circuit 110 is able to drive the display panel 120 to display an image in a display area 122 of the display panel 120. In some embodiments, the display area 122 further has a touch detection function. The driving circuit 110 may detect a touch event occurring in the display area 122 through a touch electrode in the display area 122. In the embodiment shown in FIG. 1, the display area 122 further has an active stylus touch detection function. The driving circuit 110 may transmit an uplink signal to the active stylus 10 through electrodes in the display area 122 and receive a downlink signal emitted by the active stylus 10 through the electrodes in the display area 122.

In addition, in the embodiment shown in FIG. 1, the driving circuit 110 may further transmit the uplink signal to the active stylus 10 through a frame area (or a border area) 121 of the display panel 120. The frame area 121 is adjacent to a frame (not shown) of the display panel 120 and is located outside the display area 122. The frame of the display panel 120 is configured to fix the display panel 120 to a specific location within the display device 100. Generally, the frame area 121 is configured with a light shielding layer, so that the frame area 121 does not have a display function. According to the actual design, the light shielding layer may include a black matrix layer, an opaque printing ink layer, or any other opaque non-conductive material layer.

Figure 2:
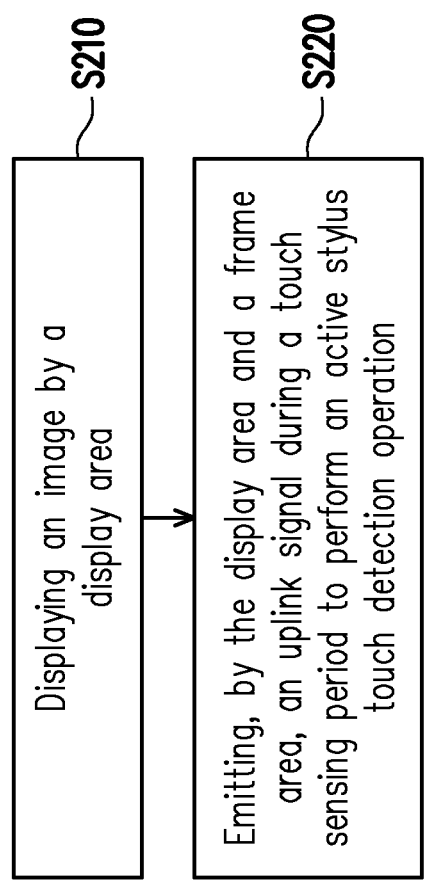
FIG. 2 is a schematic flowchart of an operation method of a display panel according to an embodiment of the disclosure.

FIG. 2 is a schematic flowchart of an operation method of the display panel 120 according to an embodiment of the disclosure. With reference to FIG. 1 and FIG. 2, in step S210, the driving circuit 110 may drive the display panel 120, so that the display area 122 of the display panel 120 displays the image. In step S220, the frame area 121 and the display area 122 of the display panel 120 emit the uplink signal to the active stylus 10 during a touch sensing period to perform an active stylus touch detection operation. Before the active stylus 10 enters the display area 122, the active stylus 10 may perform the active stylus touch detection operation (e.g., performing a pairing operation) in advance based on the uplink signal emitted by the frame area 121. Thereby, the active stylus 10 is ready to emit the downlink signal to the display panel 120 before entering the display area 122.

Figure 3:
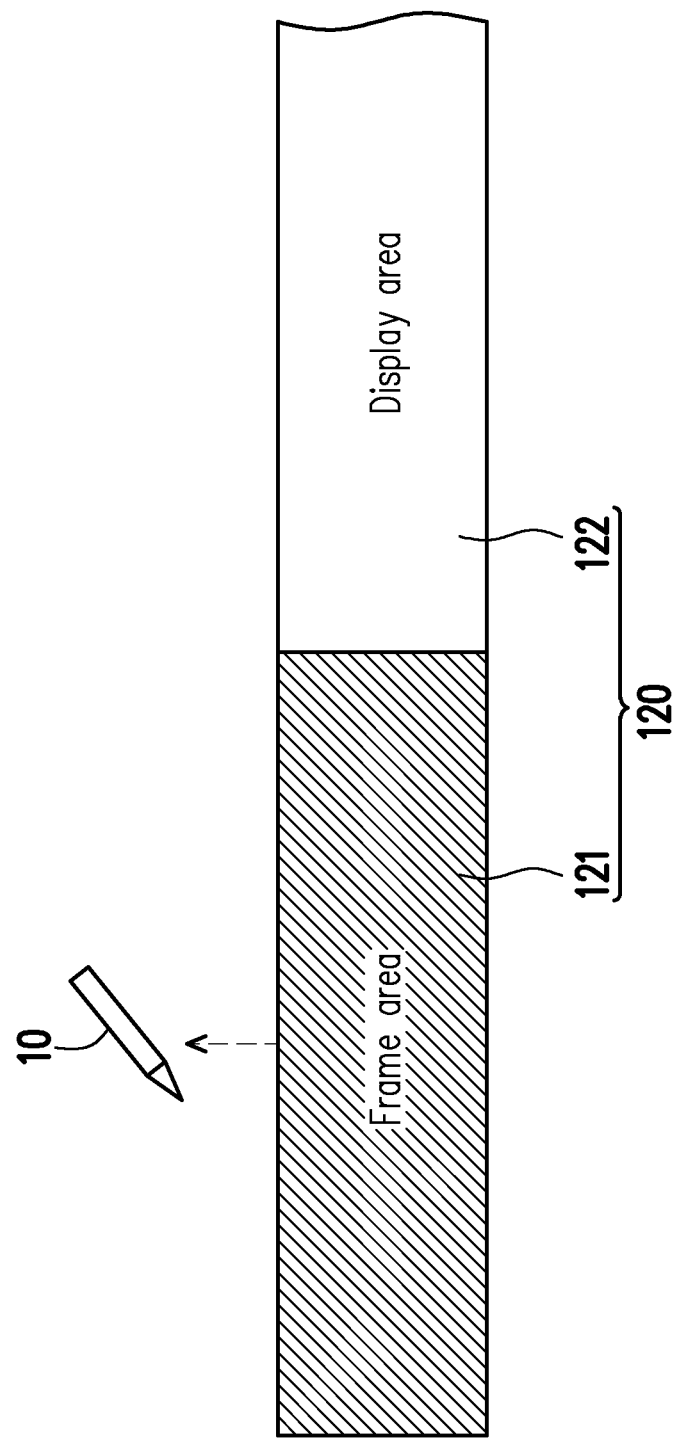
FIG. 3 and FIG. 4 are schematic cross-sectional views of a display panel according to an embodiment of the disclosure.

FIG. 3 is a schematic cross-sectional view of the display panel 120 according to an embodiment of the disclosure. The descriptions of the active stylus 10, the display panel 120, the frame area 121, and the display area 122 as illustrated in FIG. 3 may be referred to as the descriptions of the active stylus 10, the display panel 120, the frame area 121, and the display area 122 illustrated in FIG. 1 and thus will not be repeated. When the active stylus 10 moves to the top of the frame area 121 of the display panel 120, the uplink signal may be emitted through a signal path in the frame area 121 during the touch sensing period, so as to perform the active stylus touch detection operation. According to the actual design, the signal path in the frame area 121 may be arranged in a metal layer M0 (not shown), a metal layer M1 (not shown), a metal layer M2 (not shown), a metal layer M3 (not shown), an indium tin oxide (ITO) layer (not shown), and/or other conductive layers of the display panel 120. While the active stylus 10 is drawing a line/moving toward the display area 122 from the frame area 121, the active stylus 10 in the frame area 121 may receive the uplink signal emitted by the frame area 121. The uplink signal emitted by the frame area 121 may trigger the active stylus 10 to emit the downlink signal, and the display area 122 may receive the downlink signal emitted by the active stylus 10 to perform a positioning operation on the active stylus 10.

Figure 4:
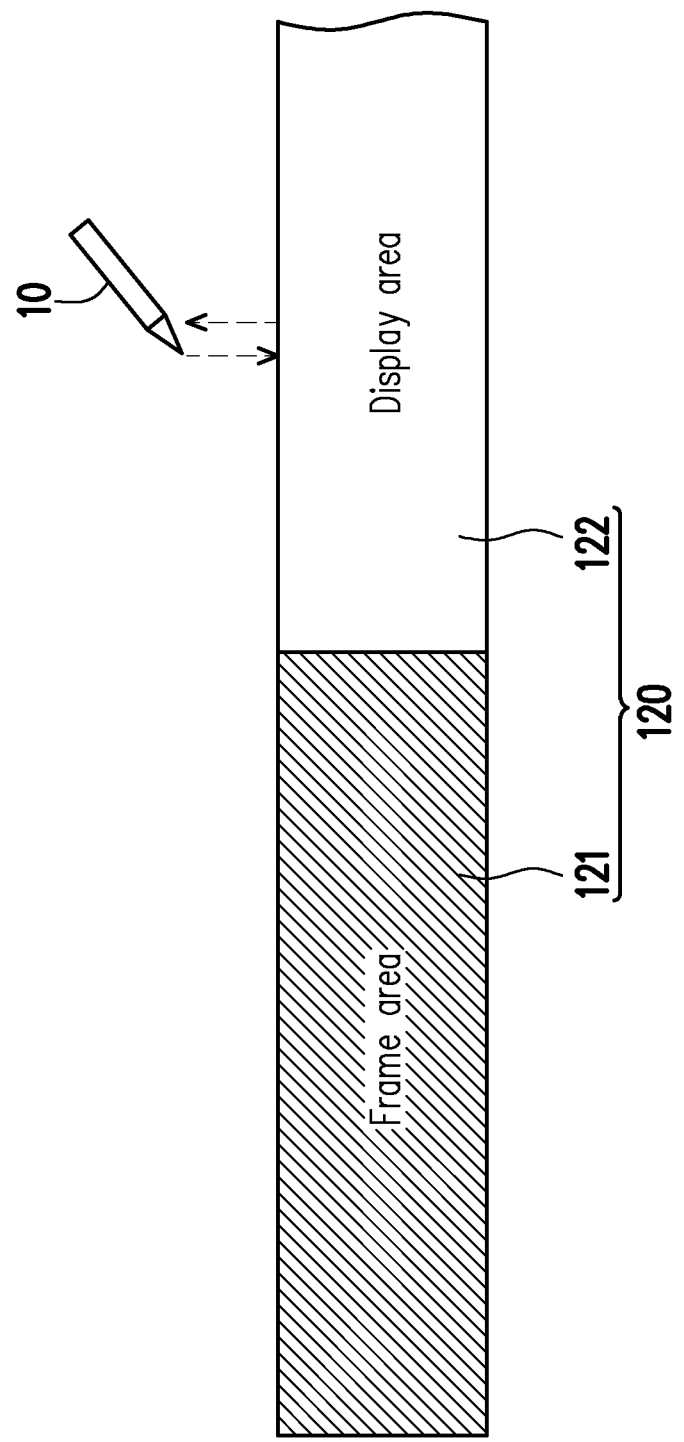

FIG. 4 is a schematic cross-sectional view of the display panel 120 according to an embodiment of the disclosure. The descriptions of the active stylus 10, the display panel 120, the frame area 121, and the display area 122 as illustrated in FIG. 4 may be referred to as the descriptions of the active stylus 10, the display panel 120, the frame area 121, and the display area 122 illustrated in FIG. 1 and thus will not be repeated. When the active stylus 10 moves to the top of the display area 122 of the display panel 120, the electrodes in the display area 122 may transmit the uplink signal to the active stylus 10 during the touch sensing period and receive the downlink signal emitted by the active stylus 10 to perform the active stylus touch detection operation.

The uplink signal emitted by the frame area 121 and the display area 122 may trigger the active stylus 10 to emit the downlink signal, and the display area 122 may receive the downlink signal emitted by the active stylus 10 to perform the positioning operation on the active stylus 10. While the active stylus 10 is drawing a line/moving toward the display area 122 from the frame area 121, the active stylus 10 in the frame area 121 may receive the uplink signal emitted by the frame area 121, and then the active stylus 10 in the display area 122 may continue to receive the uplink signal emitted by the display area 122. Therefore, before the active stylus 10 enters the display area 122, the active stylus 10 may perform the active stylus touch detection operation (e.g., a pairing operation) in advance based on the uplink signal emitted by the frame area 121. The display panel 120 may instantly emit the uplink signal to perform the active stylus touch detection operation. Thereby, the active stylus 10 is ready to emit the downlink signal to the display panel 120 before entering the display area 122. Accordingly, when the active stylus 10 draws a line toward the display area 122 from the frame area 121, the active stylus 10 may write on the edge of the display area 122 and on other locations.

Figure 5:
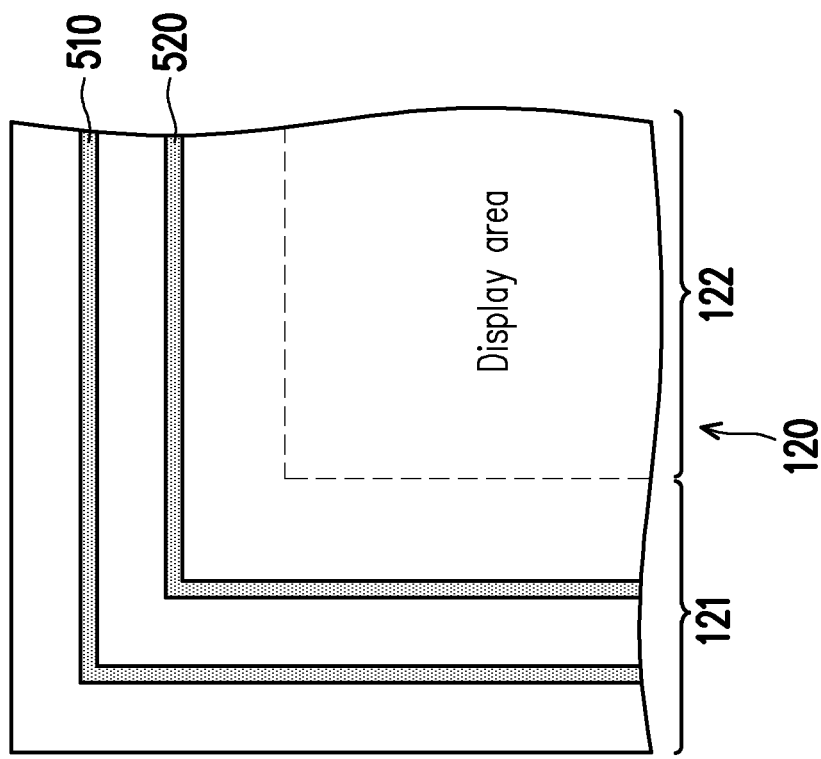
FIG. 5 is a schematic top view of a frame area of a display panel according to an embodiment of the disclosure.

FIG. 5 is a schematic top view of the frame area 121 of the display panel 120 according to an embodiment of the disclosure. FIG. 5 shows a partial enlarged view of the frame area 121. In the embodiment shown in FIG. 5, an electrostatic discharge (ESD) protection conductive wire 510 and an uplink signal wire 520 are arranged in the frame area 121. The ESD wire 510 is configured for ESD. The ESD wire 510 and the uplink signal wire 520 are arranged in the same conductive layer of the display panel 120. In some embodiments, the ESD wire 510 and the uplink signal wire 520 are arranged in the metal layer M1 or M2 of the display panel 120. The uplink signal wire 520 is configured to be coupled to a touch detection circuit (e.g., the driving circuit 110) to receive the uplink signal from the touch detection circuit and emit the uplink signal. The touch detection circuit may emit the uplink signal to the active stylus 10 through the uplink signal wire 520 in the frame area 121 during the touch sensing period to perform the active stylus touch detection operation.

Figure 6:
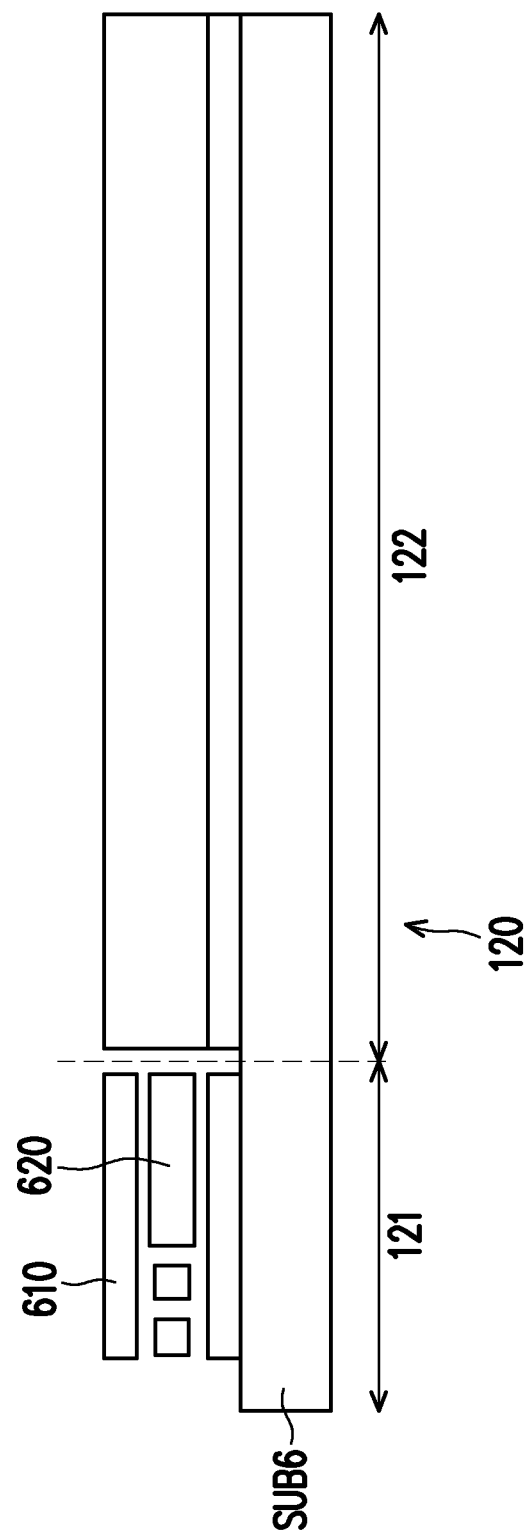
FIG. 6 is a schematic cross-sectional view of a frame area of a display panel according to an embodiment of the disclosure.

FIG. 6 is a schematic cross-sectional view of the frame area 121 of the display panel 120 according to an embodiment of the disclosure. The display panel 120 shown in FIG. 6 has a lower substrate SUB6. A thin film transistor (TFT) of the display panel 120 may be arranged on the lower substrate SUB6. When the display panel 120 is a non-self-luminous panel, the lower substrate SUB6 may be a transparent substrate, so that the back light may penetrate the display panel 120.

In the embodiment shown in FIG. 6, an uplink signal wire 610 and a gate driving circuit 620, which is alternatively referred to as a gate driver-on-array (GOA), are arranged in the frame area 121. The descriptions of the uplink signal wire 610 shown in FIG. 6 may be referred to as and deduced from the descriptions of to the uplink signal wire 520 shown in FIG. 5 and thus will not be repeated here. The gate driving circuit 620 may drive a plurality of scan lines (not shown) in the display area 122 during a display driving period to display the image. In the embodiment shown in FIG. 6, the gate driving circuit 620 and the uplink signal wire 610 are arranged in different conductive layers of the display panel 120. For instance, the frame area 121 is configured with a light shielding layer, so that the frame area 121 does not have the display function. The uplink signal wire 610 may serve as the light shielding layer.

Figure 7:
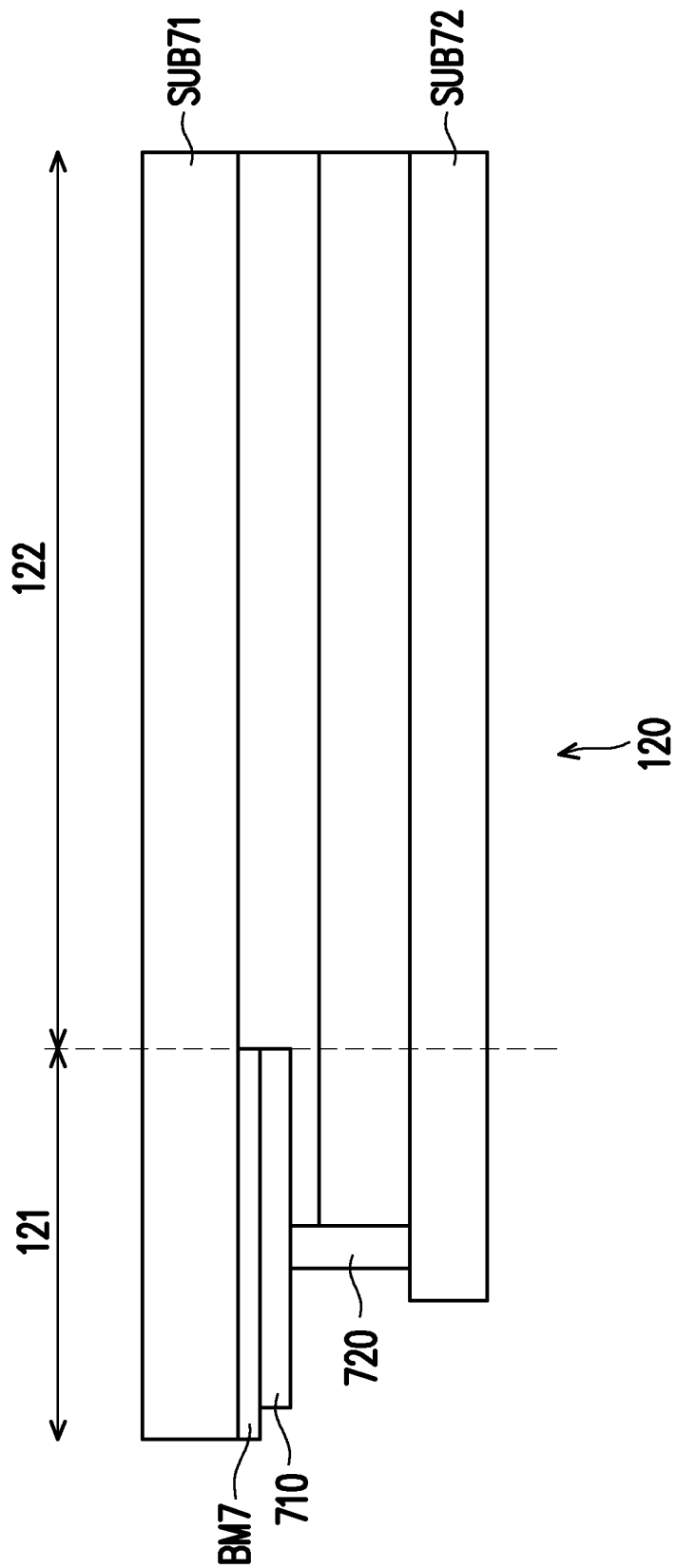
FIG. 7 is a schematic cross-sectional view of a frame area of a display panel according to another embodiment of the disclosure.

FIG. 7 is a schematic cross-sectional view of the frame area 121 of the display panel 120 according to another embodiment of the disclosure. The display panel 120 shown in FIG. 7 has an upper substrate SUB71 and a lower substrate SUB72. The upper substrate SUB71 may be a transparent substrate, such as a glass substrate. The TFT of the display panel 120 may be arranged on the lower substrate SUB72. When the display panel 120 is a non-self-luminous panel, the lower substrate SUB72 may be a transparent substrate, so that the back light may penetrate the display panel 120.

In the embodiment shown in FIG. 7, a black matrix layer BM7 (a light shielding layer) of the upper substrate SUB71 is arranged in the frame area 121, so that the frame area 121 does not have the display function. The frame area 121 is further configured with an uplink signal wire 710. The descriptions of the uplink signal wire 710 shown in FIG. 7 may be referred to as and deduced from the descriptions of the uplink signal wire 520 shown in FIG. 5 and thus will not be repeated herein. The uplink signal wire 710 is arranged on a lower side of the black matrix layer BM7. According to the actual design, in some embodiments, the uplink signal wire 710 may be a silver paste printed circuit or an adhesive copper foil circuit. The uplink signal wire 710 may be electrically connected to a touch detection circuit (e.g., the driving circuit 110) through a conductive material 720 to receive the uplink signal from the touch detection circuit and emit the uplink signal.

Figure 8:
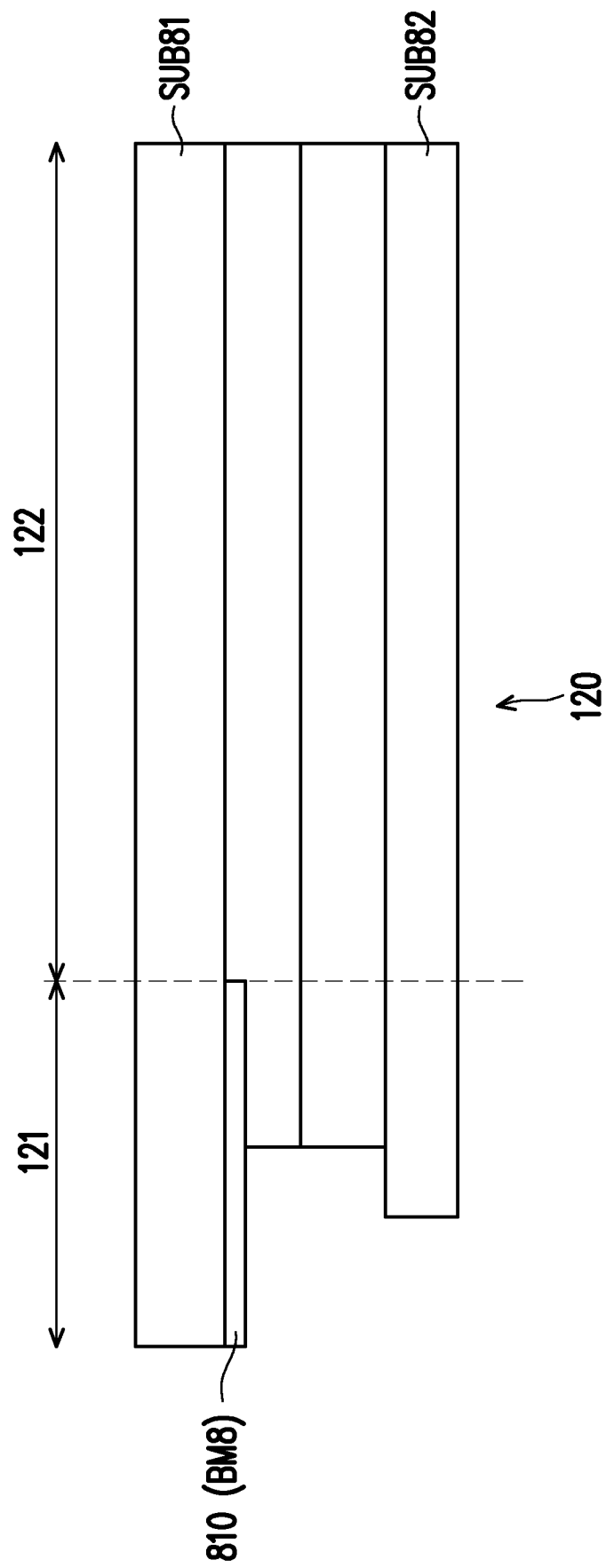
FIG. 8 is a schematic cross-sectional view of a frame area of a display panel according to still another embodiment of the disclosure.

FIG. 8 is a schematic cross-sectional view of the frame area 121 of the display panel 120 according to still another embodiment of the disclosure. The display panel 120 shown in FIG. 8 has an upper substrate SUB81 and a lower substrate SUB82. The upper substrate SUB81 may be a transparent substrate, such as a glass substrate. The TFT of the display panel 120 may be arranged on the lower substrate SUB82. When the display panel 120 is a non-self-luminous panel, the lower substrate SUB82 may be a transparent substrate, so that the back light may penetrate the display panel 120.

In the embodiment shown in FIG. 8, the frame area 121 is further configured with an uplink signal wire 810. The descriptions of the uplink signal wire 810 shown in FIG. 8 may be referred to as and deduced from the descriptions of the uplink signal wire 520 shown in FIG. 5 and thus will not be repeated herein. The uplink signal wire 810 may serve as a black matrix layer BM8 (a light shielding layer) of the upper substrate SUB81, so that the frame area 121 does not have the display function. The black matrix layer BM8 in the frame area 121 may be made of a conductive ink, so that the black matrix layer BM8 has the characteristics of the uplink signal wire 810. In the embodiment shown in FIG. 8, the upper substrate SUB81 is coated with the conductive black matrix layer BM8 and does not need to be coated with other additional conductive layers. The uplink signal wire 810 may be electrically connected to a touch detection circuit (e.g., the driving circuit 110) through a conductive material to receive the uplink signal from the touch detection circuit and emit the uplink signal.

Figure 9:
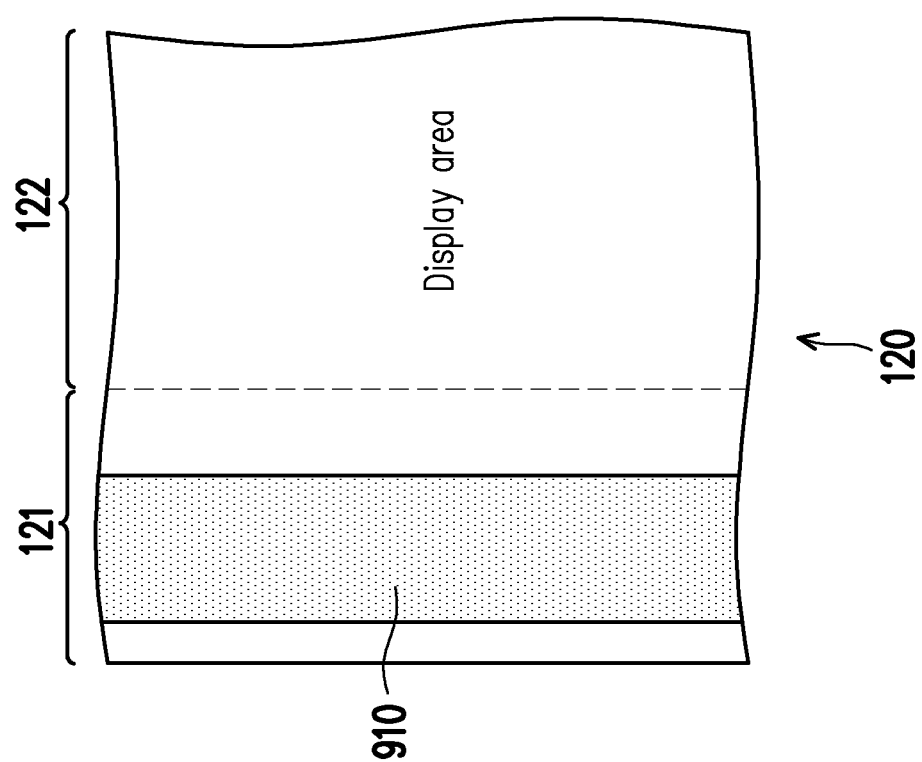
FIG. 9 is a schematic top view of a frame area of a display panel according to an embodiment of the disclosure.

FIG. 9 is a schematic top view of the frame area 121 of the display panel 120 according to an embodiment of the disclosure. FIG. 9 shows a partial enlarged view of the frame area 121. In the embodiment shown in FIG. 9, the frame area 121 is configured with a gate driving circuit (or referred to as a GOA) 910. The gate driving circuit 910 may drive a plurality of scan lines (not shown) in the display area 122 during a display driving period to display the image.

Figure 10A:
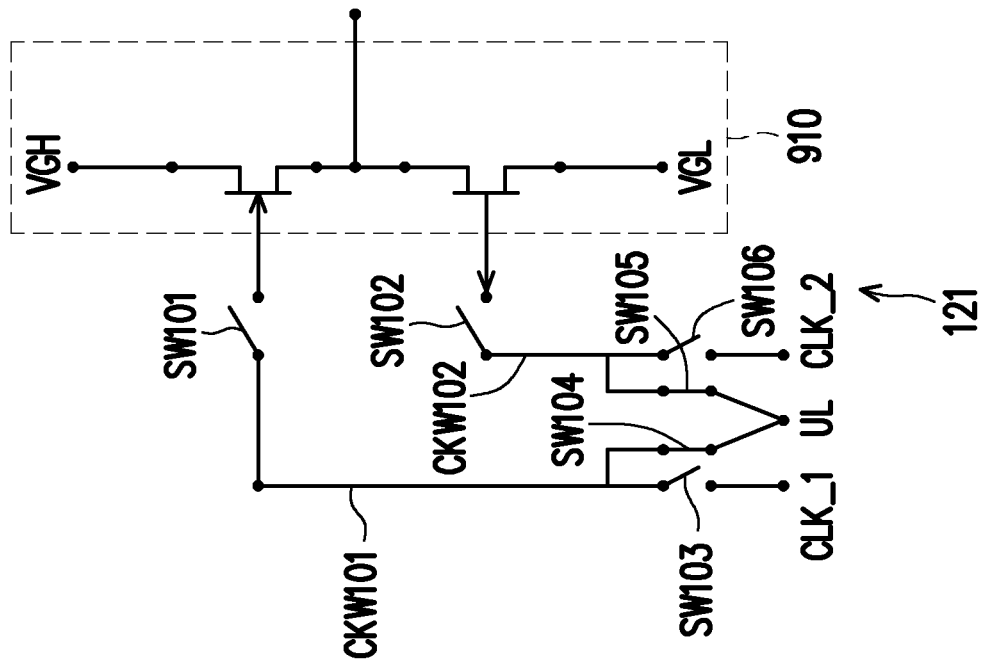
FIG. 10A and FIG. 10B are schematic circuit diagrams of a gate driving circuit according to an embodiment of the disclosure.
Figure 10B:
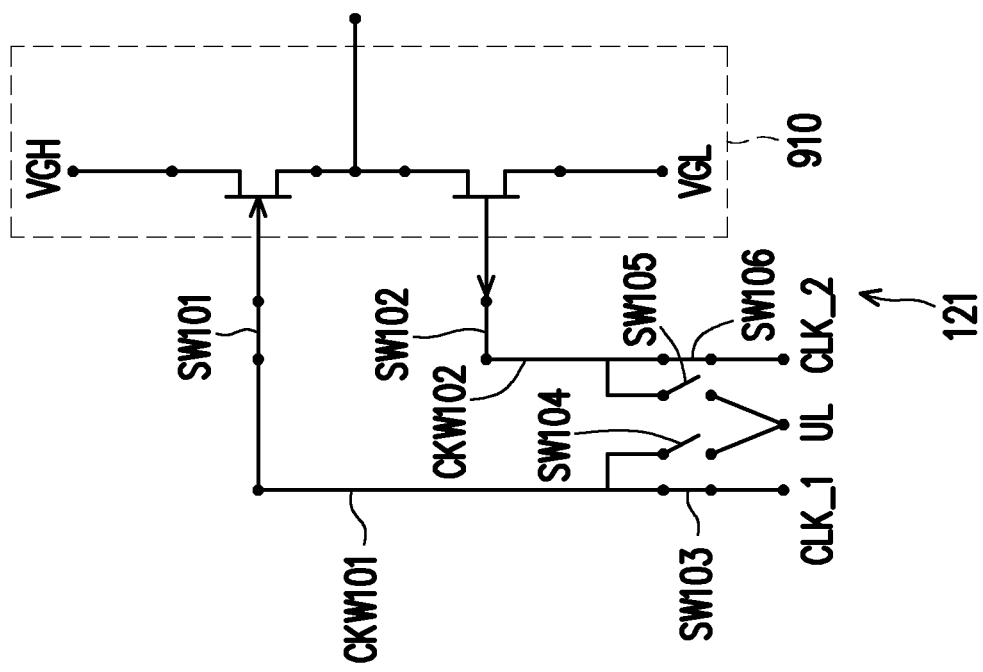

FIG. 10A and FIG. 10B are schematic circuit diagrams of the gate driving circuit 910 according to an embodiment of the disclosure. FIG. 10A shows a switching status of the gate driving circuit 910 which operates during a display driving period, and FIG. 10B shows a switching status of the gate driving circuit 910 which operates during a touch sensing period. In the embodiment shown in FIG. 10A and FIG. 10B, the frame area 121 includes the gate driving circuit 910, a switch SW101, a switch SW102, a switch SW103, a switch SW104, a switch SW105, and a switch SW106. The descriptions of the gate driving circuit 910 shown in FIGS. 10A and 10B may be referred to as and deduced from the descriptions of the gate driving circuit 910 shown in FIG. 9. VGH and VGL shown in FIG. 10A and FIG. 10B respectively represent voltage sources of different levels.

A first terminal of the switch SW101 is coupled to one clock terminal of the gate driving circuit 910, and a first terminal of the switch SW102 is coupled to the other clock terminal of gate driving circuit 910. A first terminal of a clock wire CKW101 is coupled to a second terminal of the switch SW101, and the first terminal of the clock wire CKW102 is coupled to a second terminal of the switch SW102. A first terminal of the switch SW103 is coupled to a second terminal of the clock wire CKW101. A second terminal of the switch SW103 is configured to be coupled to a gate clock source (not shown) to receive a clock signal CLK_1. A first terminal of the switch SW104 is coupled to the second terminal of the clock wire CKW101. A second terminal of the switch SW104 and a second terminal of the switch SW105 are configured to be coupled to a touch detection circuit (e.g., the driving circuit 110) to receive an uplink signal UL. A first terminal of the switch SW105 and a first terminal of switch SW106 are coupled to the second terminal of the clock wire CKW102. A second terminal of the switch SW106 is configured to be coupled to the gate clock source (not shown) to receive a clock signal CLK_2.

During the display driving period shown in FIG. 10A, the switch SW101, the switch SW102, the switch SW103, and the switch SW106 are turned on, while the switch SW104 and the switch SW105 are turned off. Therefore, the clock signal CLK_1 of the gate clock source may be transmitted to the one clock terminal of the gate driving circuit 910 through the switch SW103, the clock wire CKW101, and the switch SW101, and the clock signal CLK_2 of the gate clock source may be transmitted to the other clock terminal of the gate driving circuit 910 through the switch SW106, the clock wire CKW102, and the switch SW102.

During the touch sensing period shown in FIG. 10B, the switch SW101, the switch SW102, the switch SW103, and the switch SW106 are turned off, while the switch SW104 and the switch SW105 are turned on. Therefore, the clock wire CKW101 and the clock wire CKW102 may serve as the uplink signal wire. At this time, the clock wire CKW101 and the clock wire CKW102 may emit the uplink signal UL to the active stylus 10 to perform the active stylus touch detection operation.

To sum up, the frame area 121 of the display panel 120 in one or more embodiments of the disclosure may emit the uplink signal UL to the active stylus 10 during the touch sensing period. While the active stylus 10 is drawing a line/moving toward the display area 122 from the frame area 121 of the display panel 120, the active stylus 10 in the frame area 121 may receive the uplink signal UL emitted by the frame area 121, and then the active stylus 10 in the display area 122 may continue to receive the uplink signal UL emitted by the display area 122. Hence, before the active stylus 10 enters the display area 122 from the frame area 121, the active stylus 10 may perform the active stylus touch detection operation (e.g., the pairing operation) in advance based on the uplink signal UL emitted by the frame area 121. Thereby, the active stylus 10 is ready to emit the downlink signal to the display panel 120 before entering the display area 122. As a result, when the active stylus 10 draws a line toward the display area 122 from the frame area 121, the active stylus 10 may write on the edge of the display area 122 and on other locations.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A display panel, comprising:
a display area, configured to display an image and emit an uplink signal during a touch sensing period to perform an active stylus touch detection operation; and
a frame area, comprising an uplink signal wire and configured to emit the uplink signal via the uplink signal wire during the touch sensing period to perform the active stylus touch detection operation, wherein the uplink signal wire is configured to emit the uplink signal, wherein the frame area further comprises a gate driving circuit, configured to drive a plurality of scan lines in the display area,
wherein the frame area comprises: a first switch, having a first terminal coupled to a clock terminal of the gate driving circuit; a clock wire, having a first terminal coupled to a second terminal of the first switch; and a second switch, having a first terminal coupled to a second terminal of the clock wire, wherein a second terminal of the second switch is configured to be coupled to a gate clock source.

2. The display panel of claim 1, wherein the frame area is adjacent to a frame of the display panel and is located outside the display area.

3. The display panel of claim 1, wherein the display panel emits the uplink signal to an active stylus to trigger the active stylus to emit a downlink signal, and the display area receives the downlink signal emitted by the active stylus to perform a positioning operation on the active stylus.

4. The display panel of claim 1, wherein the frame area is configured with a light shielding layer, so that the frame area does not have a display function.

5. The display panel of claim 4, wherein the light shielding layer is a black matrix layer or an opaque printing ink layer.

6. The display panel of claim 1, wherein the touch detection circuit emits the uplink signal through the uplink signal wire in the frame area during the touch sensing period to perform the active stylus touch detection operation.

7. The display panel of claim 6, wherein the frame area further comprises:
an electrostatic discharge protection wire, configured for electrostatic discharge protection, wherein the electrostatic discharge protection wire and the uplink signal wire are arranged in a same conductive layer of the display panel.

8. The display panel of claim 6, wherein the frame area is configured with a light shielding layer, and the uplink signal wire serves as the light shielding layer, so that the frame area does not have a display function.

9. The display panel of claim 6, further comprising:
an upper substrate, having a black matrix layer in the frame area, wherein the uplink signal wire is arranged on a lower side of the black matrix layer.

10. The display panel of claim 9, wherein the uplink signal wire is a silver paste printed circuit or an adhesive copper foil circuit.

11. The display panel of claim 6, further comprising:
an upper substrate, wherein the uplink signal wire serves as a black matrix layer of the upper substrate.

12. The display panel of claim 6, wherein the gate driving circuit and the uplink signal wire are arranged on different conductive layers of the display panel.

13. The display panel of claim 1, wherein
the first switch and the second switch are turned on during a display driving period, so that a clock signal of a gate clock source is transmitted to the clock terminal of the gate driving circuit through the second switch, the clock wire, and the first switch, wherein the frame area further comprises:
a third switch, having a first terminal coupled to the second terminal of the clock wire, wherein a second terminal of the third switch is configured to be coupled to a touch detection circuit to receive the uplink signal, and the first switch and the second switch are turned off and the third switch is turned on during the touch sensing period, so that the clock wire serves as an uplink signal wire to emit the uplink signal.

14. An operation method of a display panel, the display panel comprising a display area and a frame area, the operation method comprising:
displaying an image by the display area, wherein the frame area comprises an uplink signal wire; and
emitting, by the display area and the uplink signal wire in the frame area, an uplink signal during a touch sensing period to perform an active stylus touch detection operation, wherein the uplink signal wire is configured to emit the uplink signal, wherein the frame area further comprises a gate driving circuit configured to drive a plurality of scan lines in the display area,
wherein the frame area comprises: a first switch, having a first terminal coupled to a clock terminal of the gate driving circuit; a clock wire, having a first terminal coupled to a second terminal of the first switch; and a second switch, having a first terminal coupled to a second terminal of the clock wire, wherein a second terminal of the second switch is configured to be coupled to a gate clock source.

15. The operation method of claim 14, further comprising:
emitting, by the display panel, the uplink signal to an active stylus to trigger the active stylus to emit a downlink signal; and
receiving, by the display area, the downlink signal emitted by the active stylus to perform a positioning operation on the active stylus.

16. The operation method of claim 14, wherein the frame area is configured with a light shielding layer, so that the frame area does not have a display function.

17. The operation method of claim 16, wherein the light shielding layer comprises a black matrix layer.

18. The operation method of claim 14, wherein the uplink signal is provided by a touch detection circuit during the touch sensing period to perform the active stylus touch detection operation.

19. The operation method of claim 18, wherein the frame area further comprises an electrostatic discharge protection wire configured for electrostatic discharge protection, and the electrostatic discharge protection wire and the uplink signal wire are arranged in a same conductive layer of the display panel.

20. The operation method of claim 18, wherein the uplink signal wire serves as a light shielding layer in the frame area, so that the frame area does not have a display function.

21. The operation method of claim 18, wherein the display panel further comprises an upper substrate having a black matrix layer in the frame area, and the uplink signal wire is arranged on a lower side of the black matrix layer.

22. The operation method of claim 21, wherein the uplink signal wire is a silver paste printed circuit or an adhesive copper foil circuit.

23. The operation method of claim 18, wherein the display panel further comprises an upper substrate, and the uplink signal wire serves as a black matrix layer of the upper substrate.

24. The operation method of claim 18, wherein the gate driving circuit and the uplink signal wire are arranged on different conductive layers of the display panel.

25. The operation method of claim 14, further comprising:
driving the plurality of scan lines in the display area by the gate driving circuit in the frame area, wherein the frame area further comprises a third switch, a first terminal of the third switch is coupled to the second terminal of the clock wire, and a second terminal of the third switch is configured to be coupled to a touch detection circuit to receive the uplink signal;
turning on the first switch and the second switch during a display driving period, so that a clock signal of a gate clock source is transmitted to the clock terminal of the gate driving circuit through the second switch, the clock wire, and the first switch; and
turning off the first switch and the second switch and turning on the third switch during the touch sensing period, so that the clock wire serves as an uplink signal wire to emit the uplink signal.

26. A display panel, comprising:
a display area, configured to display an image and emit an uplink signal during a touch sensing period to perform an active stylus touch detection operation; and
a frame area, comprising an uplink signal wire and configured to emit the uplink signal via the uplink signal wire during the touch sensing period to perform the active stylus touch detection operation, wherein the uplink signal wire is configured to emit the uplink signal, wherein the frame area further comprises a gate driving circuit, configured to drive a plurality of scan lines in the display area, when the active stylus moves draws a line toward the display area from the frame area, the active stylus performs a pairing operation in advance in the frame area.

27. An operation method of a display panel, the display panel comprising a display area and a frame area, the operation method comprising:
displaying an image by the display area, wherein the frame area comprises an uplink signal wire; and
emitting, by the display area and the uplink signal wire in the frame area, an uplink signal during a touch sensing period to perform an active stylus touch detection operation, wherein the uplink signal wire is configured to emit the uplink signal, wherein the frame area further comprises a gate driving circuit configured to drive a plurality of scan lines in the display area,
wherein when the active stylus moves toward the display area from the frame area, the active stylus performs a pairing operation in advance in the frame area.

* * * * *